United States Patent
Jeong et al.

(10) Patent No.: US 12,261,312 B2
(45) Date of Patent: Mar. 25, 2025

(54) BATTERY RACK AND ENERGY STORAGE SYSTEM COMPRISING THE SAME

(71) Applicant: LG ENERGY SOLUTION, LTD., Seoul (KR)

(72) Inventors: Ji-Won Jeong, Daejeon (KR); Seung-Hyun Kim, Daejeon (KR); Young-Seok Lee, Daejeon (KR); Kyung-Hyun Bae, Daejeon (KR); Jin-Kyu Shin, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 270 days.

(21) Appl. No.: 17/790,669

(22) PCT Filed: Mar. 4, 2021

(86) PCT No.: PCT/KR2021/002712
§ 371 (c)(1),
(2) Date: Jul. 1, 2022

(87) PCT Pub. No.: WO2021/177762
PCT Pub. Date: Sep. 10, 2021

(65) Prior Publication Data
US 2023/0040296 A1    Feb. 9, 2023

(30) Foreign Application Priority Data

Mar. 4, 2020 (KR) .................. 10-2020-0027372

(51) Int. Cl.
*H01M 10/613* (2014.01)
*A62C 3/16* (2006.01)
*H01M 10/627* (2014.01)
*H01M 10/6567* (2014.01)
*H01M 50/211* (2021.01)
*H01M 50/24* (2021.01)

(52) U.S. Cl.
CPC .............. *H01M 50/24* (2021.01); *A62C 3/16* (2013.01); *H01M 10/613* (2015.04); *H01M 10/627* (2015.04); *H01M 10/6567* (2015.04); *H01M 50/211* (2021.01); *H01M 2220/10* (2013.01)

(58) Field of Classification Search
CPC .. H01M 50/24; H01M 10/613; H01M 10/627; H01M 10/6567; H01M 50/211; H01M 2220/10; H01M 50/249; H01M 50/202; H01M 50/209; H01M 50/233; H01M 50/251; H01M 50/668; H01M 50/691; H01M 2200/00; H01M 2220/20; A62C 3/16; A62C 35/11; Y02E 60/10
See application file for complete search history.

(56) References Cited

U.S. PATENT DOCUMENTS

| | | | |
|---|---|---|---|
| 10,511,001 B1* | 12/2019 | Zhang | H01M 10/425 |
| 2007/0126396 A1 | 6/2007 | Yang | |
| 2008/0292950 A1* | 11/2008 | Maeda | H01M 50/105 |
| | | | 429/247 |
| 2013/0224637 A1 | 8/2013 | Choi et al. | |
| 2013/0260191 A1* | 10/2013 | Takahashi | H01M 10/4257 |
| | | | 429/61 |
| 2014/0017528 A1* | 1/2014 | Uehara | H01M 10/482 |
| | | | 429/61 |
| 2018/0366699 A1* | 12/2018 | Geshi | H01M 10/6566 |
| 2019/0372068 A1* | 12/2019 | Naito | H01M 10/6563 |
| 2020/0243813 A1* | 7/2020 | Zhang | H01M 50/298 |
| 2020/0403283 A1* | 12/2020 | Gao | H05K 7/20309 |
| 2021/0234226 A1* | 7/2021 | Niziol | H01M 10/486 |

FOREIGN PATENT DOCUMENTS

| | | |
|---|---|---|
| CN | 207818832 U | 9/2018 |
| CN | 109743006 A | 5/2019 |
| CN | 20900982 U | 6/2019 |
| CN | 110010810 A * | 7/2019 |
| CN | 110649194 A | 1/2020 |
| JP | 3403964 B2 | 5/2003 |
| JP | 2016-192280 A | 11/2016 |
| JP | 2019-75191 A | 8/2019 |
| KR | 10-2015-0038990 A | 4/2015 |
| KR | 10-1584295 B1 | 1/2016 |
| KR | 10-2016-0037542 A | 4/2016 |
| KR | 20-0489617 Y1 | 8/2019 |

OTHER PUBLICATIONS

International Search Report (PCT/ISA/210) issued in PCT/KR2021/002712, dated Jun. 17, 2021.
Extended European Search Report for corresponding European Application No. 21764281.8, dated Mar. 17, 2023.

* cited by examiner

*Primary Examiner* — Muhammad S Siddiquee
(74) *Attorney, Agent, or Firm* — Birch, Stewart, Kolasch & Birch, LLP

(57) ABSTRACT

The battery rack includes a plurality of battery packs vertically arranged, each battery pack including a plurality of secondary batteries stacked in a direction, and a pack housing having an internal space to receive the plurality of secondary batteries and configured to be supplied with a fire extinguishing liquid when an internal temperature equals or rises above a predetermined temperature, and a rack case having a receiving space to receive the plurality of battery packs, and including a plurality of rack plates, each having a mounting surface on which the battery pack is mounted, the mounting surface sloping at a predetermined angle with declining height as it goes in any one direction, and an extension portion having an end of any one direction extending further outward than the lower battery pack.

10 Claims, 12 Drawing Sheets

BATTERY RACK AND ENERGY STORAGE SYSTEM COMPRISING THE SAME

TECHNICAL FIELD

The present disclosure relates to a battery rack and an energy storage system comprising the same, and more particularly, to a battery rack for effectively preventing the spread of a fire or heat and re-using an undamaged battery pack when the fire or thermal runaway occurs while in use.

The present application claims the benefit of Korean Patent Application No. 10-2020-0027372 filed on Mar. 4, 2020 with the Korean Intellectual Property Office, the disclosure of which is incorporated herein by reference in its entirety.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging may be done whenever it is convenient, the self-discharge rate is very low and the energy density is high.

A lithium secondary battery primarily uses lithium-based oxide and a carbon material as a positive electrode active material and a negative electrode active material respectively. The lithium secondary battery includes an electrode assembly including a positive electrode plate and a negative electrode plate coated with the positive electrode active material and the negative electrode active material respectively with a separator interposed between the positive electrode plate and the negative electrode plate, and a packaging or a battery pouch case in which the electrode assembly is hermetically received together with an electrolyte solution.

Recently, secondary batteries are widely used in not only small devices such as portable electronic devices, but also medium- and large-scale devices such as vehicles and energy storage systems. For use in medium- and large-scale device applications, many secondary batteries are electrically connected to increase the capacity and output. In particular, pouch-type secondary batteries are widely used in medium- and large-scale devices due to their easy-to-stack advantage.

More recently, with the use as a source of energy and the growing need for large-capacity structures, there is an increasing demand for a battery rack including a plurality of battery packs, each including a plurality of secondary batteries electrically connected in series and/or in parallel, a battery module in which the plurality of secondary batteries is received, and a battery management system (BMS).

The battery rack typically includes a metal rack case to protect the plurality of battery packs from external impacts or receive and store the battery packs. Recently, with the increasing demand for high capacity battery racks, the demand for battery racks including a plurality of battery packs is increasing.

However, when thermal runaway occurs in a secondary battery of any one of the plurality of battery packs in the battery rack and the secondary battery burns or explodes, a larger explosion may occur due to the transfer of heat or flames to adjacent secondary batteries, so there have been many attempts to prevent the subsequent fires or explosions.

Accordingly, there is a need for quick and complete fire extinguishing technology to rapidly handle thermal runaway when it occurs in a secondary battery within the battery rack.

When a fire or thermal runaway occurs in any of the plurality of battery packs, the fire has been suppressed by feeding the fire extinguishing liquid to the battery pack in which the fire or thermal runaway occurred, but the fire extinguishing liquid is fed to a battery pack in which the fire did not occur and thus the corresponding battery pack is contaminated with the fire extinguishing liquid and cannot be re-used.

DISCLOSURE

Technical Problem

The present disclosure is designed to solve the above-described problem, and therefore the present disclosure is directed to providing a battery rack for effectively preventing the spread of a fire or heat and re-using an undamaged battery pack when the fire or thermal runaway occurs while in use.

These and other objects and advantages of the present disclosure may be understood by the following description, and will be apparent from the embodiments of the present disclosure. In addition, it will be readily appreciated that the objects and advantages of the present disclosure may be realized by means set forth in the appended claims and combinations thereof.

Technical Solution

To achieve the above-described object, a battery rack according to the present disclosure includes a plurality of battery packs vertically arranged, each battery pack of the plurality of battery packs including a plurality of secondary batteries stacked in a direction, and a pack housing having an internal space to receive the plurality of secondary batteries and configured to be supplied with a fire extinguishing liquid when an internal temperature equals or rises above a predetermined temperature, and a rack case having a receiving space to receive the plurality of battery packs, and including a plurality of rack plates, each rack plate of the plurality of rack plates having a mounting surface on which a battery pack of the plurality of battery packs is mounted, the mounting surface sloping at a predetermined angle with a declining height as the rack plate goes in a first direction, and an extension portion having an end extending further outward in the first direction than the battery pack.

The rack case may include a front frame disposed at a front end of the plurality of battery packs and including a post configured to support the ground, a rear frame disposed at a rear end of the plurality of battery packs and including a post configured to support the ground, and a plurality of fixing brackets respectively coupled to the plurality of rack plates and coupled to the post of each of the front frame and the rear frame at the predetermined angle.

The end of the extension portion of a lower rack plate among the plurality of rack plates may be disposed at a more inward position than the end of the extension portion of an upper rack plate among the plurality of rack plates.

A lower end of a lower battery pack among the plurality of battery packs may be disposed at a more inward position than a lower end of an upper battery pack among the plurality of battery packs.

Each rack plate of the plurality of rack plates may include a stopper to keep the mounted battery pack from moving in the first direction.

Each battery pack of the plurality of battery packs may further include a cover which extends outward from an end of the battery pack to allow the fire extinguishing liquid falling from an upper rack plate of the plurality of rack plates to flow outward.

An upper rack plate of the plurality of rack plates may have a guide groove to guide movement of the fire extinguishing liquid moving out of the pack housing.

A lower rack plate of the plurality of rack plates may include a discharge portion configured to receive the fire extinguishing liquid falling from the upper rack plate and flow the fire extinguishing liquid outwardly.

Each battery pack of the plurality of battery packs may include an absorption member between the plurality of secondary batteries disposed at an opposite direction to the first direction among the plurality of secondary batteries in the battery pack to absorb the fire extinguishing liquid.

To achieve the above-described object, an energy storage system according to the present disclosure includes at least one battery rack.

Advantageous Effects

According to an aspect of the present disclosure, the present disclosure includes the rack case having the receiving space to receive the plurality of battery packs, and including the plurality of rack plates including the mounting surface on which the battery pack is mounted, the mounting surface sloping at a predetermined angle with the declining height as it goes in any one direction, and the extension portion having an end of any one direction extending further outward than the lower battery pack, thereby preventing the fire extinguishing liquid supplied to the specific battery pack among the plurality of battery packs from flowing into the lower battery pack when thermal runaway or a fire occurs in the specific battery pack. Accordingly, it is possible to solve the problem caused by the supply of the fire extinguishing liquid that is to say, the remaining battery pack except the battery pack in which thermal runaway or a fire occurred is wetted with the fire extinguishing liquid and cannot be re-used.

According to an aspect of an embodiment of the present disclosure, the extended end of the extension portion of the lower rack plate among the plurality of rack plates is disposed at the more inward position than the end of the extension portion of the upper rack plate, so when the fire extinguishing liquid is supplied, the fire extinguishing liquid moving out of the pack housing is discharged through the extension portion, and in this instance, since the extended length of the extension portion disposed at the lower position is shorter than that of the extension portion disposed at the higher position, the lower battery pack may avoid contamination by the fire extinguishing liquid falling in the direction of gravity from the extension portion disposed at the higher position.

According to an aspect of the present disclosure, the present disclosure, among the plurality of battery packs, the end of any one direction of the lower battery pack is disposed at the more inward position than the end of the upper battery pack, so when the fire extinguishing liquid is supplied to the battery pack, the fire extinguishing liquid moving out of the pack housing does not flow to the lower battery pack and may vertically fall by the gravity. That is, the battery pack may avoid contamination by the fire extinguishing liquid falling in the direction of gravity from the extension portion disposed at the higher position.

According to another aspect of the present disclosure, the rack plate includes the guide groove configured to guide the movement of the fire extinguishing liquid moving out of the pack housing, thereby controlling the movement of the fire extinguishing liquid to a specific location of the rack plate, and preventing the fire extinguishing liquid from being fed into the lower battery pack due to the unexpected flow of the fire extinguishing liquid. Accordingly, it is possible to prevent the battery pack in which thermal runaway or a fire did not occur from being contaminated with the fire extinguishing liquid. The present disclosure can re-use the battery pack in which thermal runaway or a fire did not occur.

BRIEF DESCRIPTION OF THE DRAWINGS

The accompanying drawings illustrate preferred embodiments of the present disclosure, and together with the following detailed description, serve to provide a further understanding of the technical aspects of the present disclosure. However, the present disclosure should not be construed as being limited to the drawings.

DETAILED DESCRIPTION

Figure 1:
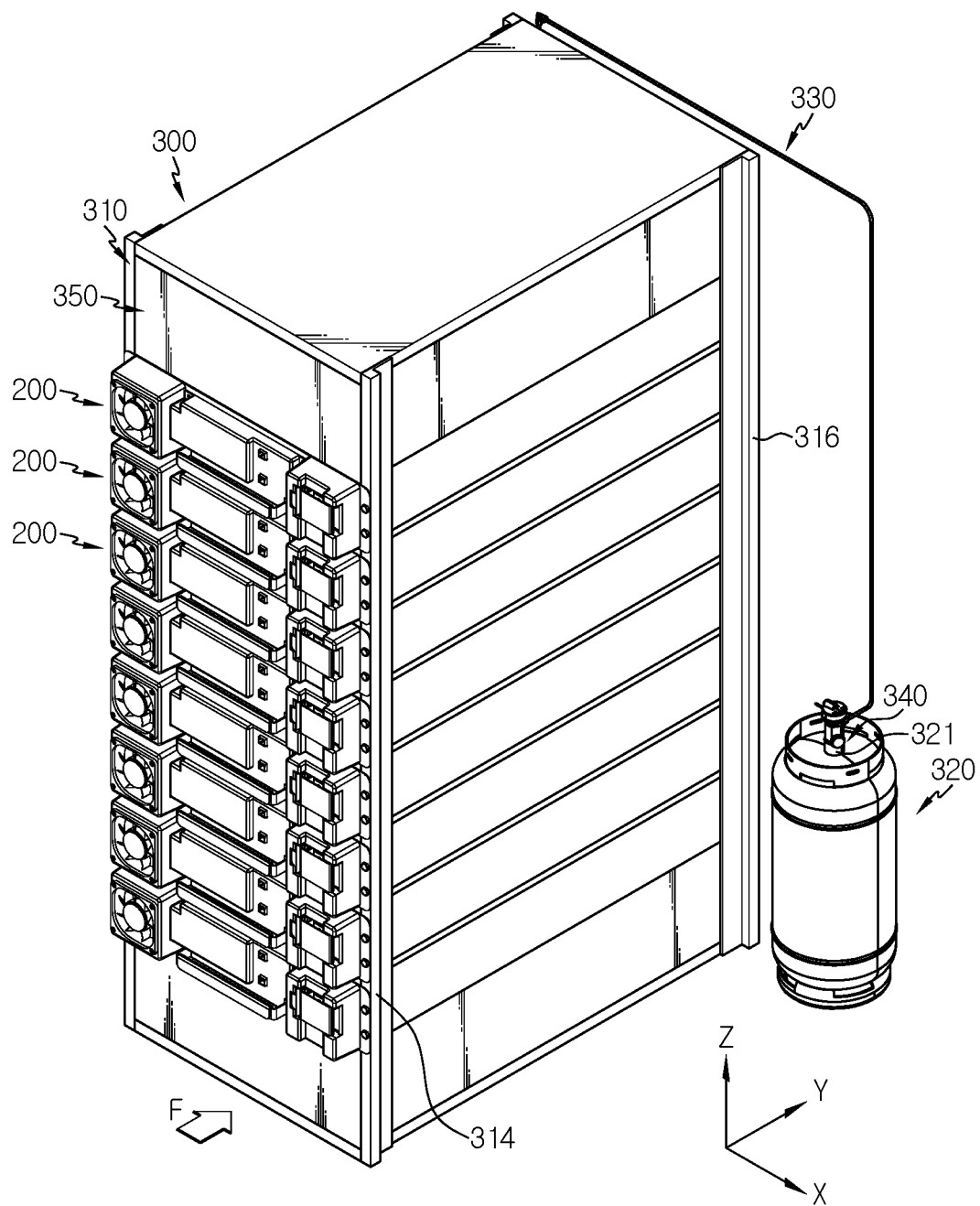
FIG. 1 is a schematic perspective view of a battery rack according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
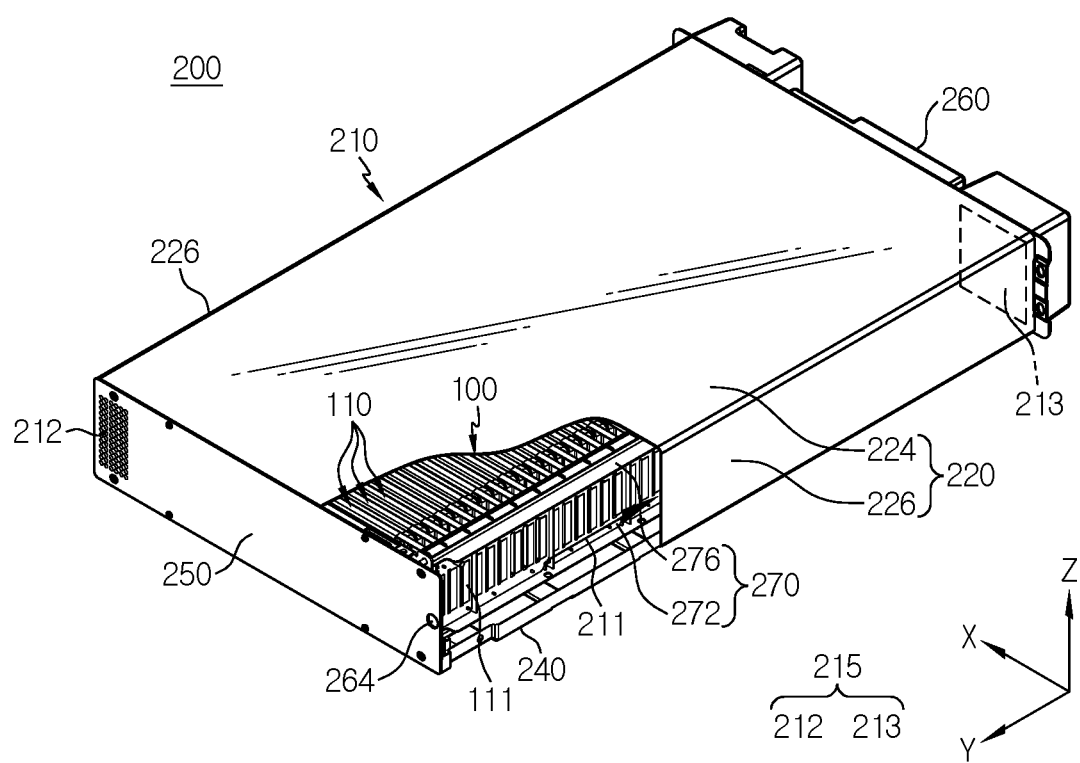
FIG. 2 is a schematic rear perspective view of a battery pack of a battery rack according to an embodiment of the present disclosure.
Figure 3:
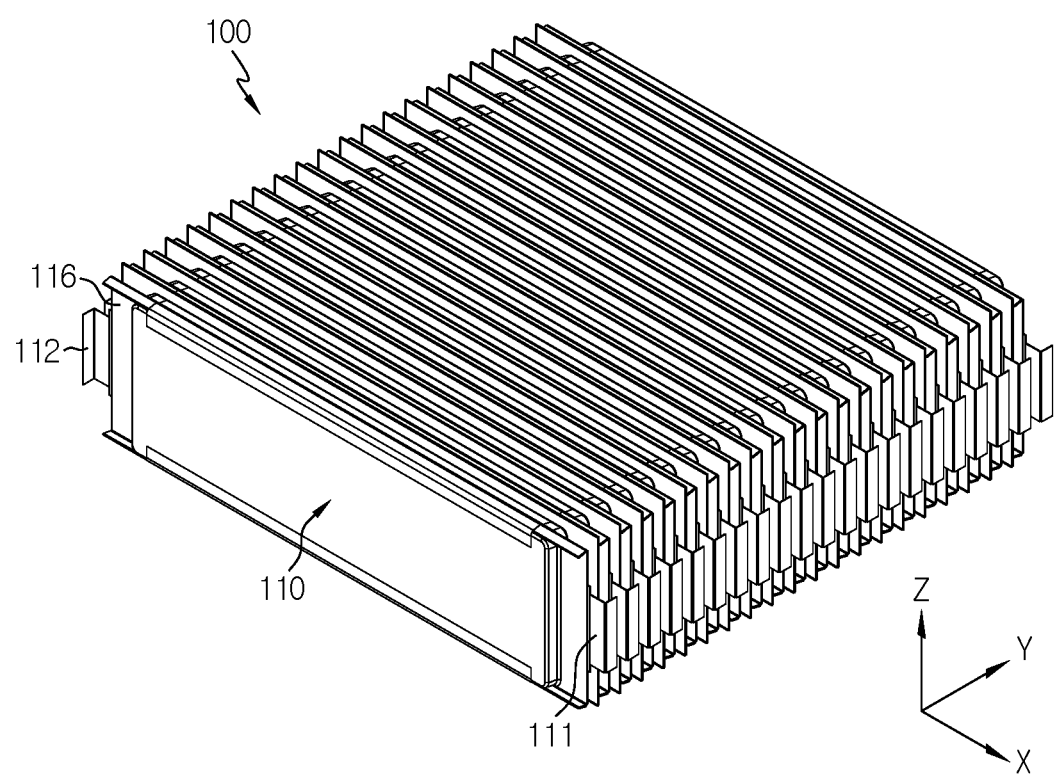
FIG. 3 is a schematic perspective view of a cell assembly of a battery pack of a battery rack according to an embodiment of the present disclosure.

FIG. 1 is a schematic perspective view of a battery rack according to an embodiment of the present disclosure. FIG. 2 is a schematic rear perspective view of a battery pack of the battery rack according to an embodiment of the present disclosure. FIG. 3 is a schematic perspective view of a cell assembly of the battery pack of the battery rack according to an embodiment of the present disclosure. For reference, the positive and negative X-axis directions in FIG. 1 may be right and left directions. The positive and negative Z-axis directions in FIG. 1 may be up and down directions. The positive and negative Y-axis directions in FIG. 1 may be rear and front directions.

Referring to FIGS. 1 to 3, the battery rack 300 of the present disclosure includes a plurality of battery packs 200 vertically arranged and a rack case 310.

Specifically, each battery pack 200 may include a plurality of secondary batteries 110 stacked in a direction. The secondary battery 110 may be a pouch-type secondary battery 110.

In particular, the pouch-type secondary battery 110 may include an electrode assembly (not shown), an electrolyte solution (not shown) and a pouch 116.

Each secondary battery 110 may stand in a direction that is approximately perpendicular to the ground with two wide surfaces disposed in the front-rear direction and sealing portions disposed in the up, down, left and right directions when viewed from the direction F (shown in FIG. 1). In other words, each secondary battery 110 may stand upright in the vertical direction. Unless otherwise specified herein, the up, down, front, rear, left, and right directions are defined when viewed from the direction F.

Here, the pouch may have a concave receiving portion. The electrode assembly and the electrolyte solution may be received in the receiving portion. Each pouch may include an outer insulating layer, a metal layer and an inner adhesive layer, and the inner adhesive layers adhere to each other at the edges of the pouch to form the sealing portions. A terrace portion may be formed at each of the left and right ends at which a positive electrode lead 112 and a negative electrode lead 111 of the secondary battery 110 are formed.

The electrode assembly may be an assembly of an electrode plate coated with an electrode active material and a separator, and may include at least one positive electrode plate and at least one negative electrode plate with the separator interposed between. The positive electrode plate of the electrode assembly may have a positive electrode tab, and at least one positive electrode tab may be connected to the positive electrode lead 112.

Here, the positive electrode lead 112 may have one end connected to the positive electrode tab and the other end exposed through the pouch, and the exposed portion may act as an electrode terminal of the secondary battery 110, for example, a positive electrode terminal of the secondary battery 110.

The negative electrode plate of the electrode assembly may have a negative electrode tab, and at least one negative electrode tab may be connected to the negative electrode lead 111. The negative electrode lead 111 may have one end connected to the negative electrode tab and the other end exposed through the pouch, and the exposed portion may act as an electrode terminal of the secondary battery 110, for example, a negative electrode terminal of the secondary battery 110.

As shown in FIG. 3, when viewed from the direction F, the positive electrode lead 112 and the negative electrode lead 111 may be formed at the left and right ends with respect to the center of the secondary battery 110. That is, the positive electrode lead 112 may be provided at one end (the left end) with respect to the center of the secondary battery 110. The negative electrode lead 111 may be provided at the other end (the right end) with respect to the center of the secondary battery 110.

For example, as shown in FIG. 3, each secondary battery 110 of the cell assembly 100 may have the positive electrode lead 112 and the negative electrode lead 111 extending in the left-right direction.

Here, the terms representing the directions such as front, rear, left, right, up, and down may change depending on the position of the observer or the placement of the stated elements. However, in the specification, for convenience of description, the front, rear, left, right, up, and down directions are defined when viewed from the direction F.

According to this configuration of the present disclosure, it is possible to increase the area of the electrode lead in one secondary battery 110 without interruption between the positive electrode lead 112 and the negative electrode lead 111.

The positive electrode lead 112 and the negative electrode lead 111 may be formed in a plate shape. In particular, the positive electrode lead 112 and the negative electrode lead 111 may extend in the horizontal direction (X direction) with the wide surfaces standing upright in the front-rear direction.

Here, the 'horizontal direction' refers to a direction parallel to the ground when the battery pack 200 is placed on the ground, and may be referred to as at least one direction on a plane perpendicular to the vertical direction.

However, the battery pack 200 according to the present disclosure is not limited to the above-described pouch-type secondary battery 110 and may use various types of secondary batteries 110 known at the time of filing the application.

The at least two cell assemblies 100 may be arranged in the front-rear direction (Y-axis direction).

The battery pack 200 may include a busbar assembly 270 including at least one busbar 272 configured to electrically connect the plurality of secondary batteries 110 and a busbar frame 276. Specifically, the busbar 272 may have an electrically conductive metal, for example, copper, aluminum and nickel. The busbar frame 276 may have a plastic material with low electrical conductivity.

The pack housing 210 may have an internal space to receive the cell assembly 100 therein. Specifically, when viewed from the direction F of FIG. 3, the pack housing 210 may include a top cover 220, a base plate 240, a front cover 260 and a rear cover 250.

Specifically, the base plate 240 may have a larger area than the size of the lower surface of the at least two cell assemblies 100 to mount the at least two cell assemblies 100 thereon. The base plate 240 may be in the shape of a plate that extends in the horizontal direction.

The top cover 220 may include an upper wall 224 and a side wall 226 extending downward from the upper wall 224. The upper wall 224 may be in the shape of a plate that extends in the horizontal direction to cover the top of the cell assembly 100. The side wall 226 may be in the shape of a plate that extends downward from the left and right ends of the upper wall 224 to cover the left and right sides of the cell assembly 100.

The side wall 226 may be coupled to a portion of the base plate 240. For example, as shown in FIG. 2, the top cover 220 may include the upper wall 224 in the shape of a plate that extends in the front-rear direction and the left-right direction. The top cover 220 may include two side walls 226 extending downward from the left and right ends of the upper wall 224. The lower end of each of the two side walls 226 may be coupled to the left and right ends of the base plate 240. In this instance, the coupling method may be male-female coupling or weld coupling.

The front cover 260 may be configured to cover the front side of the plurality of secondary batteries 110. For example, the front cover 260 may be in the shape of a plate having a larger size than the size of the front side of the plurality of secondary batteries 110. The plate may stand in the vertical direction.

The rear cover 250 may be configured to cover the rear side of the cell assembly 100. For example, the rear cover 250 may be in the shape of a plate having a larger size than the size of the rear side of the plurality of secondary batteries 110.

The pack housing 210 may have an internal space to receive the plurality of secondary batteries 110, and may be supplied with a fire extinguishing liquid when the internal temperature equals or rises above a predetermined temperature. Here, the predetermined temperature may be 300° C. or above.

Specifically, the rear cover 250 disposed at the rear side of each of the at least two battery packs 200 may include a feed port 264 through which the fire extinguishing liquid is fed. The feed port 264 may be in communication with a refrigerant movement path 211. That is, the feed port 264 may be in communication with the refrigerant movement path 211 disposed on the left and right sides of the cell assembly 100.

The pack housing 210 may receive the cell assembly 100 inside, and have an opening 215 to through which the outdoor air enters and exits the pack housing 210. For example, as shown in FIG. 2, the opening 215 may include an inlet 213 and an outlet 212. Each of the inlet 213 and the outlet 212 may be formed in a portion of the pack housing 210. The inlet 213 may be configured to allow the outdoor air to be fed into the pack housing 210. The outlet 212 may be formed in a portion of the pack housing 210 and configured to allow the fed air to exit.

Referring back to FIG. 1, the battery rack 300 may include a fire extinguishing liquid tank 320, a pipe 330 and a fire extinguishing valve 340.

To begin with, the fire extinguishing liquid tank 320 may store the fire extinguishing liquid (not shown) therein. For example, the fire extinguishing liquid may be an inorganic salt enriched solution such as potassium carbonate, a chemical foam, an air foam, carbon dioxide or water. The fire extinguishing liquid tank 320 may store compressed gas therein to spray the fire extinguishing liquid with proper pressure or move the fire extinguishing liquid along the pipe 330.

For example, the capacity of the fire extinguishing liquid tank 320 may be 59 L, the compressed gas may be 8 bar nitrogen, and the fire extinguishing liquid may be 40 L of water. Here, in case that water is used as the fire extinguishing liquid, water has a cooling and fire extinguishing effect and a heat shielding effect when sprayed into the battery pack 200, so especially when high temperature gas and flames are generated due to thermal runaway, it is effective in preventing thermal propagation. Accordingly, it is possible to effectively prevent the propagation of fires or thermal runaway between the plurality of battery packs 100.

The pipe 330 may be connected to supply the fire extinguishing liquid from the fire extinguishing liquid tank 320 to each of the at least two battery packs 200. For example, the pipe 330 may include a material having resistance to corrosion by water. For example, the pipe 330 may include stainless steel. One end of the pipe 330 may be connected to an outlet (321 in FIG. 1) of the fire extinguishing liquid tank 320. The other end of the pipe 330 may be connected to the feed port 264 of the pack housing 210.

When gas (air) in the battery pack 200 rises above the predetermined temperature, the fire extinguishing valve 340 may be configured to supply the fire extinguishing liquid from the fire extinguishing liquid tank 320 into the battery pack 200. That is, the fire extinguishing valve 340 may be an active valve having an open outlet through which the fire extinguishing liquid is fed into the battery pack 200 at the predetermined temperature or above. The active valve may be, for example, a control valve, a pneumatic valve and a solenoid valve with remote control.

Figure 4:
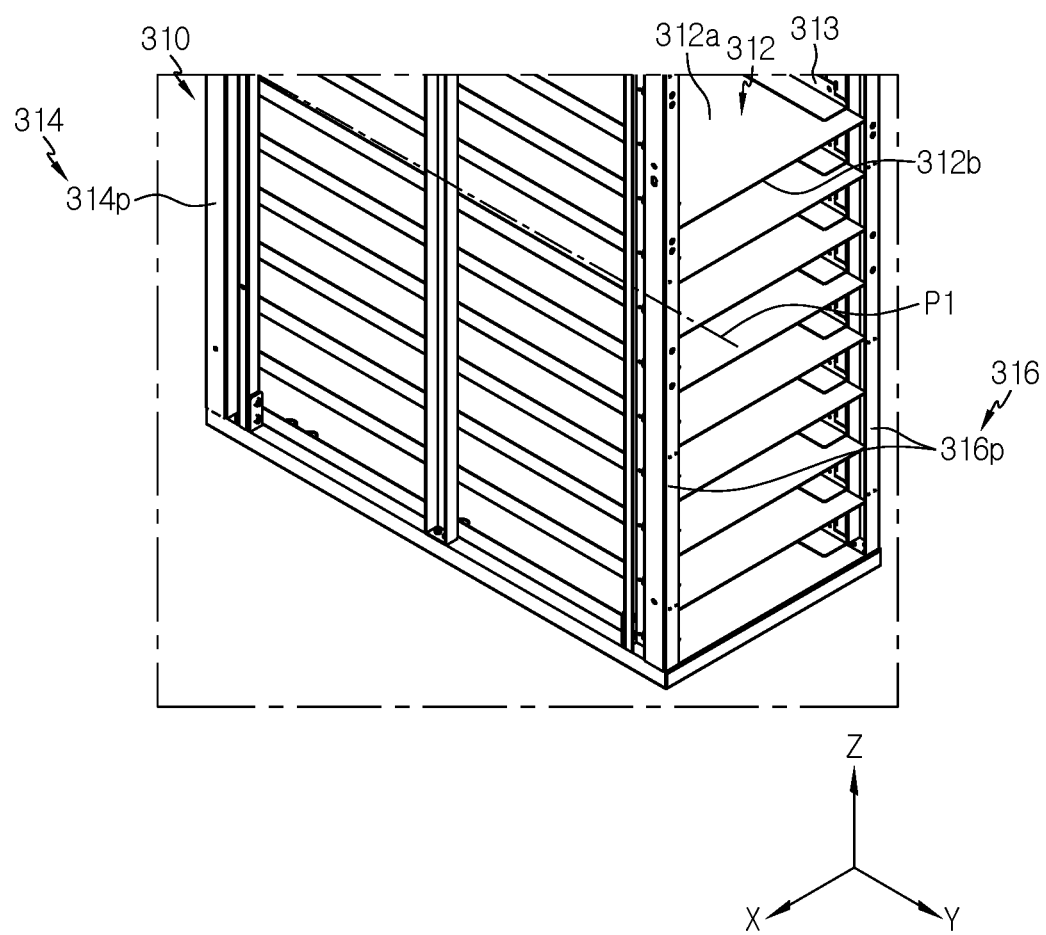
FIG. 4 is a schematic partial rear perspective view of internal components of a rack case of a battery rack according to an embodiment of the present disclosure.
Figure 5:
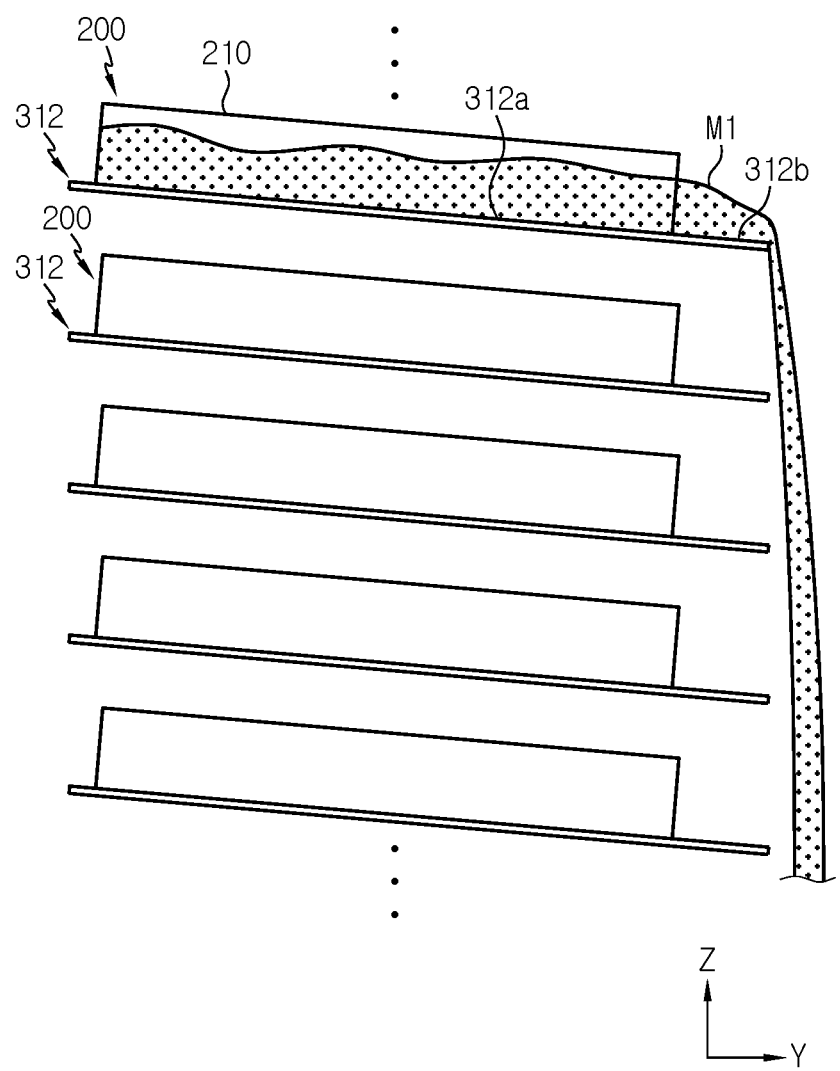
FIG. 5 is a schematic diagram of components of a battery rack according to a first embodiment of the present disclosure.

FIG. 4 is a schematic rear perspective view of the internal components of the rack case of the battery rack according to an embodiment of the present disclosure. FIG. 5 is a schematic diagram of the components of the battery rack according to a first embodiment of the present disclosure.

Referring to FIGS. 4 and 5 together with FIG. 1, the rack case 310 may have a receiving space having two open sides to receive and store each of the plurality of battery packs 200. The plurality of battery packs 200 may be vertically arranged in the rack case 310. The plurality of battery packs 200 may be vertically arranged in the rack case 310, spaced a predetermined distance apart from one another.

The rack case 310 may include a rack plate 312 on which the battery pack 200 is mounted. Specifically, the rack plate 312 may include a mounting surface 312*a* and an extension portion 312*b*. More specifically, the mounting surface 312*a* may have an area that is equivalent to or larger than the lower surface of the battery pack 200. The mounting surface 312*a* may slope at a predetermined angle relative to a horizontal line P1 such that the height declines as it goes in any one direction. That is, the rack plate 312 may be fixed to other components of the rack case 310 with the declining height of the mounting surface 312*a* as it goes in any one direction. For example, as shown in FIG. 4, the rack plate 312 may be fixed to each of a front frame 314 and a rear frame 316 of the rack case 310 such that the height of the mounting surface 312*a* declines as it goes rearward. For example, the rack plate 312 may slope at 1° to 3° with respect to the horizon.

The extension portion 312*b* of the upper rack plate 312 may have an end of any one direction extending further outward than the lower battery pack 200. For example, the rack plate 312 may include the extension portion 312*b* at the rear end. For example, the rack plate 312 may be configured to allow the fire extinguishing liquid M1 to flow along the slope of the mounting surface 312*a* and out of the extension portion 312*b* in any one direction.

According to this configuration of the present disclosure, the present disclosure includes the rack case 310 having the receiving space to receive the plurality of battery packs 200, and including the plurality of rack plates 312 including the mounting surface 312*a* on which the battery pack 200 is mounted, the mounting surface sloping at a predetermined angle with the declining height as it goes in any one direction, and the extension portion 312b having an end of any one direction extending further outward than the lower battery pack 200, thereby preventing the fire extinguishing liquid M1 supplied to the specific battery pack 200 among the plurality of battery packs from flowing into the lower battery pack 200 when thermal runaway or a fire occurs in the specific battery pack 200. Accordingly, it is possible to solve the problem caused by the supply of the fire extinguishing liquid M1, that is to say, the remaining battery pack 200 except the battery pack 200 in which thermal runaway or a fire occurred is wetted with the fire extinguishing liquid M1 and cannot be re-used.

Referring back to FIGS. 1 to 5, the rack case 310 may include the front frame 314, the rear frame 316 and a fixing bracket 313. The front frame 314 may be disposed at the front end of the plurality of battery packs 200. The front frame 314 may include a post 314p configured to support the ground.

The rear frame 316 may be disposed at the rear end of the plurality of battery packs 200. The rear frame 316 may include a post 316p configured to support the ground.

The fixing bracket 313 may be coupled to the rack plate 312. That is, the rack plate 312 may be coupled to the bottom of the fixing bracket 313. For example, the rack plate 312 and the fixing bracket 313 may be weld-coupled to each other. The fixing bracket 313 may be in the shape of a plate that is bent at approximately 90° in the letter 'L' shape. The fixing bracket 313 may extend in the front-rear direction. The front and rear ends of the fixing bracket 313 may be bolt-coupled to the front frame 314 and the rear frame 316 respectively.

The fixing bracket 313 may be coupled to the posts 314p, 316p of the front frame 314 and the rear frame 316. In this instance, the fixing bracket 313 may be fixed to the posts 314p, 316p of the front frame 314 and the rear frame 316 at a predetermined angle with the declining height as it goes in any one direction. For example, as shown in FIG. 4, the front end of the fixing bracket 313 coupled to the front frame 314 may be coupled to the higher location than the rear end of the fixing bracket 313 coupled to the rear frame 316.

Figure 6:
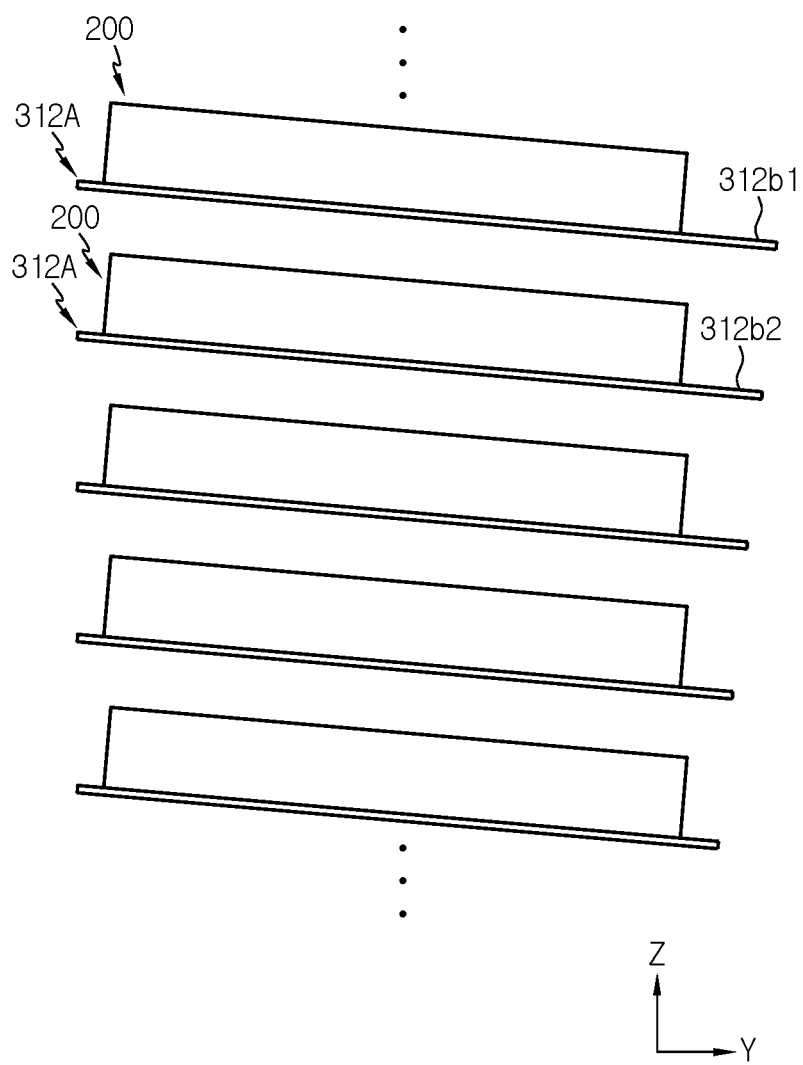
FIG. 6 is a schematic diagram of components of a battery rack according to a second embodiment of the present disclosure.

FIG. 6 is a schematic diagram of the components of a battery rack according to a second embodiment of the present disclosure.

Referring to FIG. 6 together with FIGS. 1 and 4, in the battery rack according to another embodiment of the present disclosure, the extended end of the extension portion 312b2 of the lower rack plate 312A among the plurality of rack plates 312A may be disposed on the more inward position than the end of the extension portion 312b1 of the upper rack plate 312A. For example, as shown in FIG. 6, the rack plate 312A disposed at the lower location of the rack case 310 among the rack plates 312A vertically arranged may have the extension portion 312b2 extending rearward (Y-axis direction) that is shorter than the extension portion 312b1 of the upper rack plate 312A. Accordingly, the extended end of the extension portion 312b2 of the lower rack plate 312A may be disposed on the more inward position than the end of the extension portion 312b1 of the upper rack plate 312A.

The rack case 310 may have the extended length of the extension portion of the rack plate 312A that gradually becomes shorter as it goes downward with respect to the extension portion of the rack plate 312A having the topmost battery pack 200 mounted thereon. That is, the extended length of the extension portion of the topmost rack plate 312A may be longest, and the extended length of the extension portion of the bottommost rack plate 312A may be shortest.

According to this configuration of the present disclosure, the extended end of the extension portion 312b2 of the lower rack plate 312A among the plurality of rack plates 312A is disposed on the more inward position than the end of the extension portion 312b1 of the upper rack plate 312A, so when the fire extinguishing liquid is supplied, the fire extinguishing liquid moving out of the pack housing 210 flows along the slope of the mounting surface 312a of the rack plate 312A and is discharged in any one direction through the extension portion 312b1, and in this instance, since the extended length of the extension portion 312b2 disposed at the lower position is shorter than that of the extension portion 312b1 disposed at the higher position, the lower battery pack 200 may avoid contamination by the fire extinguishing liquid falling in the direction of gravity from the extension portion 312b1 disposed at the higher position.

Figure 7:
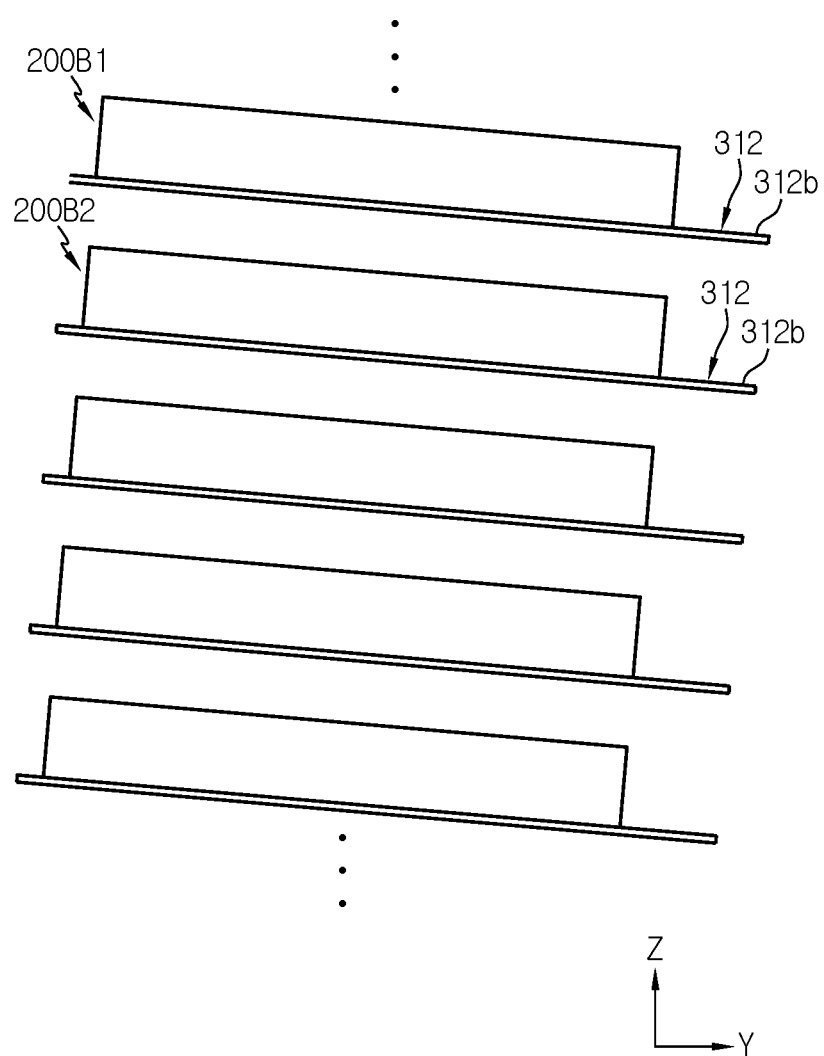
FIG. 7 is a schematic diagram of components of a battery rack according to a third embodiment of the present disclosure.

FIG. 7 is a schematic diagram of the components of a battery rack according to a third embodiment of the present disclosure.

Referring to FIG. 7 together with FIGS. 1 and 4, a plurality of battery packs 200B1, 200B2 and a plurality of rack plates 312B1, 312B2 provided in the battery rack of the third embodiment of the present disclosure may have different positions. The plurality of rack plates 312B1, 312B2 provided in the battery rack of the third embodiment may have the same extended length as opposed to the rack plates 312A of the second embodiment of FIG. 6.

Specifically, among the plurality of battery packs 200B1, 200B2, the end of any one direction of the lower battery pack 200B2 may be disposed on the more inward position than the end of the upper battery pack 200B1. That is, the extended lengths of the extension portions 312b of the rack plates 312 provided in the battery rack of the third embodiment may be the same, but the rack plate 312 disposed higher may be spaced a predetermined distance apart toward the front than the lower rack plate 312.

For example, as shown in FIG. 7, among the plurality of battery packs 200 vertically arranged, the battery pack 200B1 may be disposed at the more front position than the lower battery pack 200B2. That is, the battery rack 300 of the present disclosure may have the receiving location of the battery pack 200 of the rack case 310 disposed at the more front position as the battery pack 200 is disposed at the lower position. The location of the extension portion 312b of the rack plate 312 may be gradually extended forward as it goes downward.

According to this configuration of the present disclosure, among the plurality of battery packs 200, the end of any one direction of the lower battery pack 200 is disposed on the more inward position than the end of the upper battery pack 200, so when the fire extinguishing liquid is supplied to the battery pack 200, the fire extinguishing liquid moving out of the pack housing 210 does not flow to the lower battery pack 200 and may vertically fall by the gravity. That is, the battery pack 200 may avoid contamination by the fire extinguishing liquid falling in the direction of gravity from the extension portion 312b disposed at the higher position.

Figure 8:
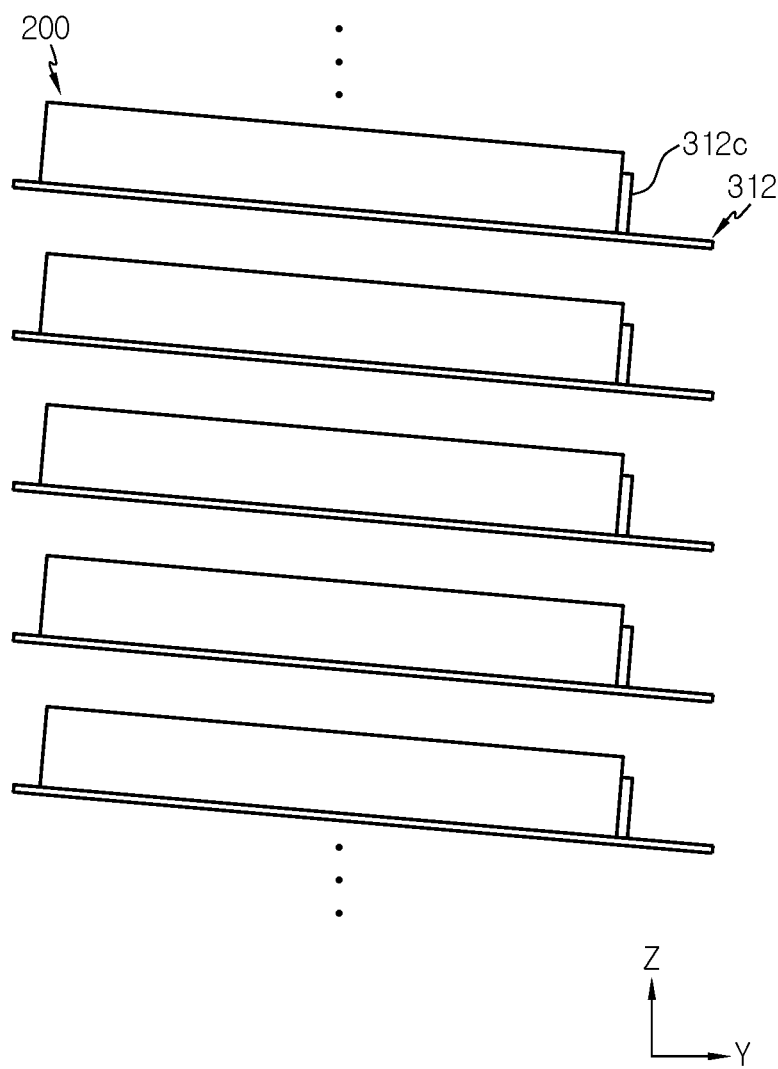
FIG. 8 is a schematic diagram of components of a battery rack according to a fourth embodiment of the present disclosure.

FIG. 8 is a schematic diagram of the components of a battery rack according to a fourth embodiment of the present disclosure.

Referring to FIG. 8 together with FIGS. 1 and 4, the battery rack according to the fourth embodiment of the present disclosure may have a stopper 312c to keep the mounted battery pack 200 from moving in any one direction.

For example, the stopper 312c may extend upward from the mounting surface 312a of the rack plate 312. The stopper 312c may be in the shape of a plate that stands upright to support the rear side of the pack housing 210 forwards.

According to this configuration of the present disclosure, the rack plate 312 includes the stopper 312c to keep the mounted battery pack 200 from moving in any one direction, thereby preventing the battery pack 200 from moving in any one direction along the slope of the mounting surface 312a of the rack plate 312 and out of the rack case 310. Accordingly, it is possible to increase the safety of the battery rack 300 of the present disclosure.

Figure 9:
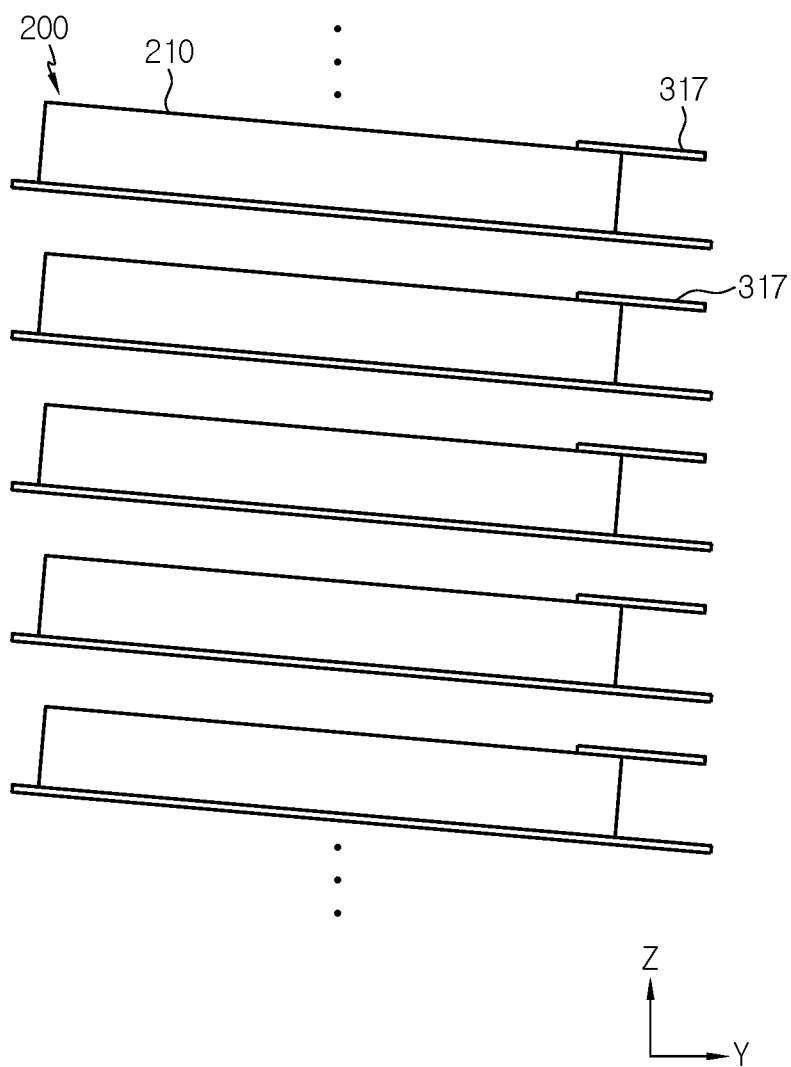
FIG. 9 is a schematic diagram of components of a battery rack according to a fifth embodiment of the present disclosure.

FIG. 9 is a schematic diagram of the components of a battery rack according to a fifth embodiment of the present disclosure.

Referring to FIG. 9 together with FIGS. 1 and 4, when comparing the battery rack according to the fifth embodiment of the present disclosure with the battery rack 300 according to the first embodiment, the battery pack 200 may further include a cover 317 on the pack housing 210. The cover 317 may be configured to allow the fire extinguishing liquid falling from the upper rack plate 312 to flow outward.

The cover 317 may be in the shape of a plate having the similar width to the rack plate 312. The cover 317 may extend outward from the end of the battery pack 200. For example, as shown in FIG. 9, the cover 317 extending rearward from the rear end of the battery pack 200 may be provided at the rear end of the battery pack 200.

According to this configuration of the present disclosure, the battery rack according to the fifth embodiment of the present disclosure includes the cover 317 extending outward from the end of the battery pack 200 to allow the fire extinguishing liquid falling from the rack plate 312 to flow outward, thereby shielding the fire extinguishing liquid falling from the upper rack plate 312, and preventing the battery pack 200 in which thermal runaway or a fire did not occur from being contaminated with the fire extinguishing liquid. Accordingly, it is possible to re-use the battery pack 200 in which thermal runaway or a fire did not occur.

Figure 10:
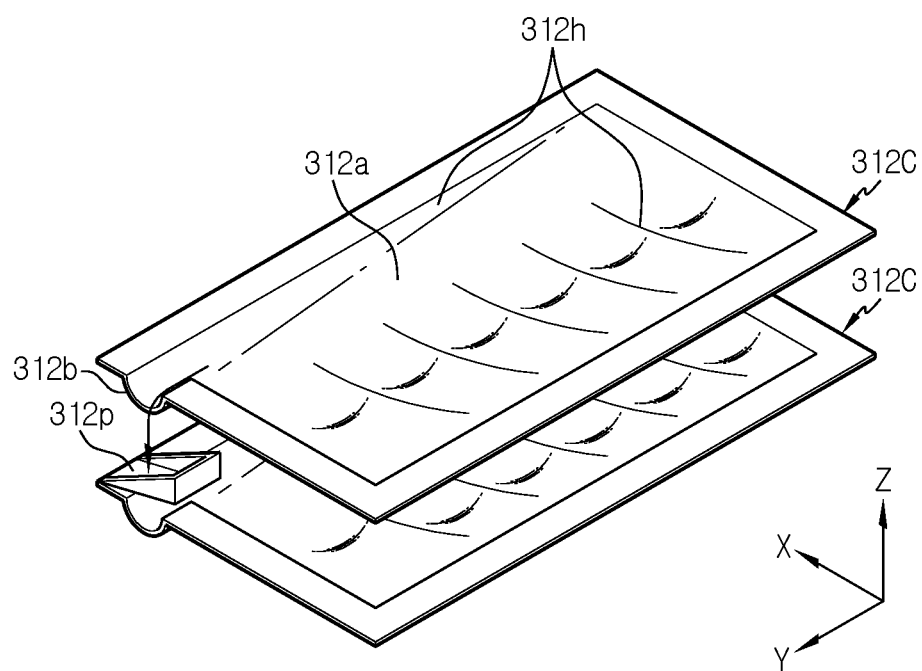
FIG. 10 is a schematic rear perspective view of components of a battery rack according to a sixth embodiment of the present disclosure.

FIG. 10 is a schematic rear perspective view of the components of a battery rack according to a sixth embodiment of the present disclosure.

Referring to FIG. 10 together with FIGS. 1 and 4, when compared with the battery rack of the first embodiment of FIG. 4, the battery rack according to the sixth embodiment of the present disclosure may further include a guide groove 312h recessed inward in the rack plate 312C. Specifically, the guide groove 312h may be a groove which linearly extends along the mounting surface 312a of the rack plate 312C. When the fire extinguishing liquid is supplied in the event of thermal runaway or a fire in the battery pack 200, the fire extinguishing liquid moving out of the pack housing 210 may be allowed to move along the guide groove 312h of the rack plate 312C. For example, as shown in FIG. 10, the rack plate 312C may be configured such that the fire extinguishing liquid moving out of the pack housing 210 moves to the extension portion 312b along the guide groove 312h and is discharged through the rear end of the rack plate 312C.

According to this configuration of the present disclosure, the rack plate 312C includes the guide groove 312h configured to guide the movement of the fire extinguishing liquid moving out of the pack housing 210, thereby controlling the movement of the fire extinguishing liquid to a specific location of the rack plate 312C, and preventing the fire extinguishing liquid from being fed into the lower battery pack 200 due to the unexpected flow of the fire extinguishing liquid. Accordingly, it is possible to prevent the battery pack 200 in which thermal runaway or a fire did not occur from being contaminated with the fire extinguishing liquid. The present disclosure can re-use the battery pack 200 in which thermal runaway or a fire did not occur.

Referring back to FIG. 10, when compared with the battery rack 300 of the first embodiment, the battery rack 300 according to the sixth embodiment of the present disclosure may include a discharge portion 312p configured to discharge the fire extinguishing liquid falling from the upper battery pack 200. For example, the discharge portion 312p may be in the shape of a conduit having an open top, extending in the upward diagonal direction. When the fire extinguishing liquid falls from the upper rack plate 312C under gravity, the discharge portion 312p may guide the falling fire extinguishing liquid to flow out to one side.

For example, as shown in FIG. 10, after the fire extinguishing liquid moving along the guide groove 312h formed in the upper rack plate 312C falls from the rear end of the rack plate 312C under gravity, at least a portion of the fire extinguishing liquid may be received in the discharge portion 312p of the lower rack plate 312C, and the received fire extinguishing liquid may move back to the right end along the conduit shape of the discharge portion 312p and may be discharged.

According to this configuration of the present disclosure, the rack plate 312C includes the discharge portion 312p configured to receive the fire extinguishing liquid falling from the upper battery pack 200 and flow it out, thereby preventing the lower battery pack 200 in which thermal runaway or a fire did not occur from being contaminated with the fire extinguishing liquid. Accordingly, it is possible to re-use the battery pack 200 in which thermal runaway or a fire did not occur.

Figure 11:
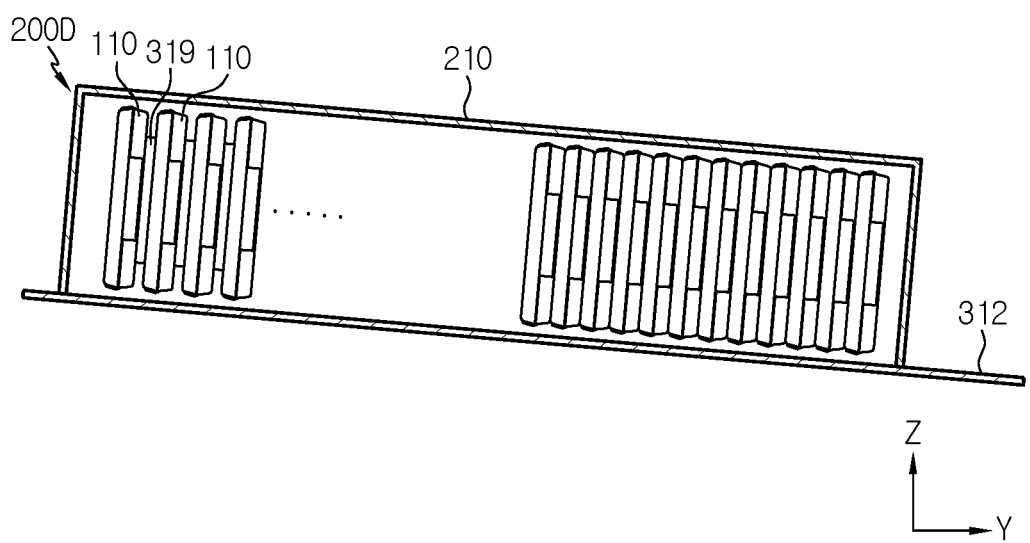
FIG. 11 is a schematic diagram of components of a battery rack according to a seventh embodiment of the present disclosure.

FIG. 11 is a schematic diagram of the components of a battery rack according to a seventh embodiment of the present disclosure.

Referring to FIG. 11 together with FIGS. 2 and 5, when compared with the battery rack 300 of the first embodiment, the battery rack according to the seventh embodiment of the present disclosure may further include an absorption member 319 in the pack housing 210 of the battery pack 200D. The absorption member 319 may be configured to absorb the fire extinguishing liquid (M1 in FIG. 5). The absorption member 319 may be a sponge. Alternatively, the absorption member 319 may include a super absorbent fiber formed by spinning super absorbent resin into a mesh shape. Here, the super absorbent resin may be configured to absorb the fire extinguishing liquid (water) that is heavier by about 500 to 1,000 times than its weight. For example, the super absorbent resin may be a super absorbent resin product from LG Chem. For example, the absorption member 319 may be made by simultaneously polymerizing acrylic acid and methyl acrylate as raw materials in water, extracting the resulting polymer and spinning into the shape of a mesh.

The absorption member 319 may be interposed between the secondary batteries 110 disposed in the opposite direction to any one direction among the plurality of secondary batteries 110. For example, as shown in FIG. 11, when the rack plate 312 slopes rearward (Y-axis direction), the fire extinguishing liquid in the pack housing 210 may fill the pack housing 210 from the rear part.

Since the battery pack 200D is placed in a rearward incline, the level of the fire extinguishing liquid at the front location in the pack housing 210 may be lower than that of the rear location in the pack housing 210. Accordingly, the use of the absorption member 319 makes it easy to sufficiently supply the fire extinguishing liquid between the plurality of secondary batteries 110, thereby effectively achieving the cooling or heat shielding of the secondary battery 110 disposed at the front location in the pack housing 210.

According to this configuration of the present disclosure, the battery pack 200D may include the absorption member 319 between the secondary batteries 110 disposed in the opposite direction to any one direction among the plurality of secondary batteries 110 to absorb the fire extinguishing liquid, thereby distributing the fire extinguishing liquid in the pack housing 210 although the battery pack 200D is inclined. Accordingly, when thermal runaway or a fire occurs in the secondary battery 110 disposed in the opposite direction to any one direction in the pack housing 210, it is possible to effectively suppress the fire or thermal runaway through heat shielding by supplying the fire extinguishing liquid.

Figure 12:
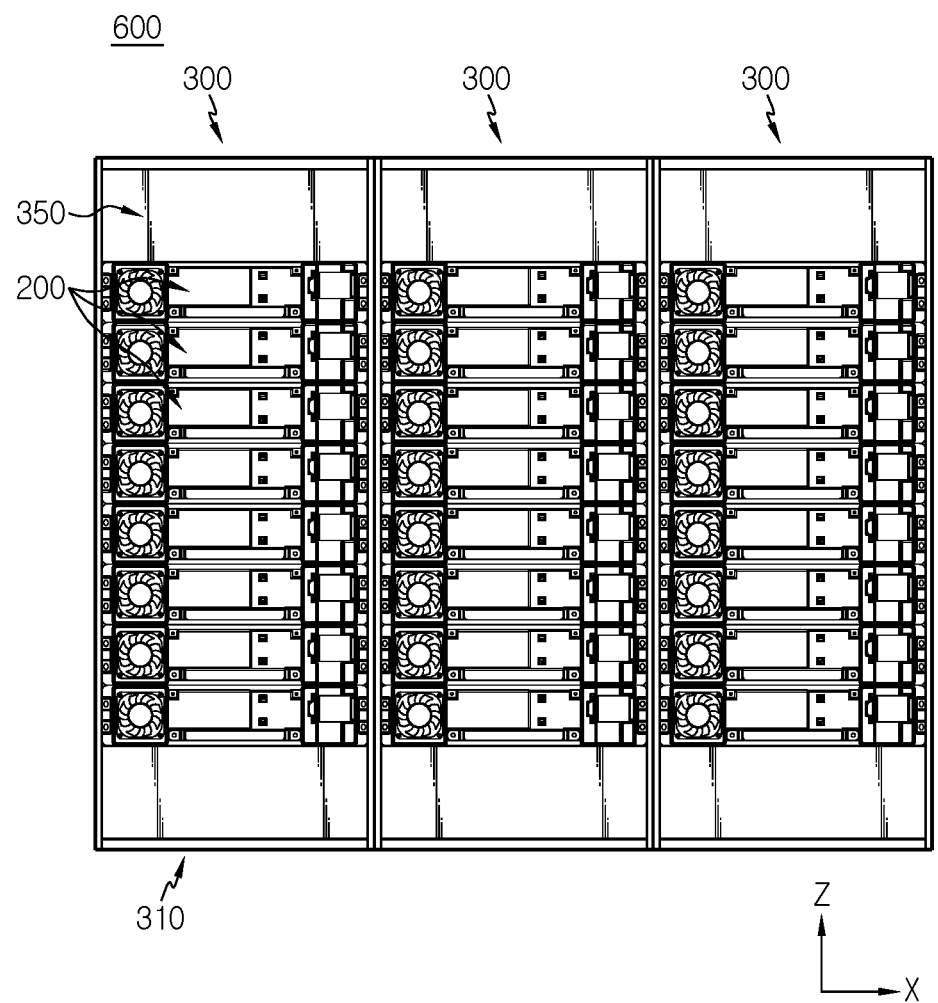
FIG. 12 is a schematic front view of an energy storage system according to an embodiment of the present disclosure.

FIG. 12 is a schematic front view of an energy storage system according to an embodiment of the present disclosure.

Referring to FIG. 12 together with FIG. 1, the battery rack 300 may further include other components such as a Battery Management System (BMS) 350 inside or outside of the rack case 310.

The energy storage system 600 according to an embodiment of the present disclosure may include at least two battery racks 300. The at least two battery racks 300 may be arranged in a direction. For example, as shown in FIG. 12, the energy storage system 600 may include three battery racks 300 arranged in a direction, each battery rack 300 including a rack case 310. Additionally, the energy storage system 600 may include a separate BMS 350 to control the charge/discharge of each of the three battery racks 300. The energy storage system 600 may include a coupling member configured to couple adjacent rack cases 310.

The terms indicating directions as used herein such as upper, lower, left, right, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

300: Battery rack
200: Battery pack
110: Secondary battery
310: Rack case
312a: Mounting surface
314: Front frame
313: Fixing bracket
317: Cover
312p: Discharge portion
600: Energy storage system
100: Cell assembly
210: Pack housing
312: Rack plate
312b: Extension portion
316: Rear frame
312c: Stopper
312h: Guide groove
319: Absorption member

What is claimed is:

1. A battery rack, comprising:
a plurality of battery packs vertically arranged, each battery pack of the plurality of battery packs including a plurality of secondary batteries stacked in a direction, and a pack housing having an internal space to receive the plurality of secondary batteries and a feed port for supplying a fire extinguishing liquid from a fire extinguishing liquid tank to each battery pack when an internal temperature in a battery pack of the plurality of battery packs equals or rises above a predetermined temperature; and
a rack case having a receiving space to receive the plurality of battery packs, and including a plurality of rack plates, each rack plate of the plurality of rack plates having a mounting surface on which a battery pack of the plurality of battery packs is mounted, the mounting surface sloping at a predetermined angle with a declining height as the rack plate goes in a first direction, and an extension portion having an end extending further outward in the first direction than the battery pack,
wherein the end of the extension portion of a lower rack plate among the plurality of rack plates is disposed at a more inward position than the end of the extension portion of an upper rack plate among the plurality of rack plates.

2. The battery rack according to claim 1, wherein the rack case includes:
a front frame disposed at a front end of the plurality of battery packs and including a post configured to support the ground;
a rear frame disposed at a rear end of the plurality of battery packs and including a post configured to support the ground; and
a plurality of fixing brackets respectively coupled to the plurality of rack plates and coupled to the post of each of the front frame and the rear frame at the predetermined angle.

3. A battery rack, comprising:
a plurality of battery packs vertically arranged, each battery pack of the plurality of battery packs including a plurality of secondary batteries stacked in a direction, and a pack housing having an internal space to receive the plurality of secondary batteries and a feed port for supplying a fire extinguishing liquid from a fire extinguishing liquid tank to each battery pack when an internal temperature in a battery pack of the plurality of battery packs equals or rises above a predetermined temperature; and
a rack case having a receiving space to receive the plurality of battery packs, and including a plurality of rack plates, each rack plate of the plurality of rack plates having a mounting surface on which a battery pack of the plurality of battery packs is mounted, the mounting surface sloping at a predetermined angle with a declining height as the rack plate goes in a first direction, and an extension portion having an end extending further outward in the first direction than the battery pack, wherein a lower end of a lower battery pack among the plurality of battery packs is disposed at a more inward position than a lower end of an upper battery pack among the plurality of battery packs.

4. The battery rack according to claim 1, wherein each rack plate of the plurality of rack plates includes a stopper to keep the mounted battery pack from moving in the first direction.

5. The battery rack according to claim 1, wherein each battery pack of the plurality of battery packs further includes a cover which extends outward from an end of the battery pack to allow the fire extinguishing liquid falling from an upper rack plate of the plurality of rack plates to flow outward.

6. The battery rack according to claim 1, wherein an upper rack plate of the plurality of rack plates has a guide groove to guide movement of the fire extinguishing liquid moving out of the pack housing.

7. The battery rack according to claim 6, wherein a lower rack plate of the plurality of rack plates includes a discharge portion configured to receive the fire extinguishing liquid falling from the upper rack plate and flow the fire extinguishing liquid outwardly.

8. The battery rack according to claim 7, wherein each battery pack of the plurality of battery packs comprises an absorption member between the plurality of secondary batteries disposed at an opposite direction to the first direction among the plurality of secondary batteries in the battery pack to absorb the fire extinguishing liquid.

9. An energy storage system comprising at least one battery rack according to claim 1.

10. The battery rack according to claim 1, wherein the first direction is a front to back direction.

* * * * *